UNITED STATES PATENT OFFICE.

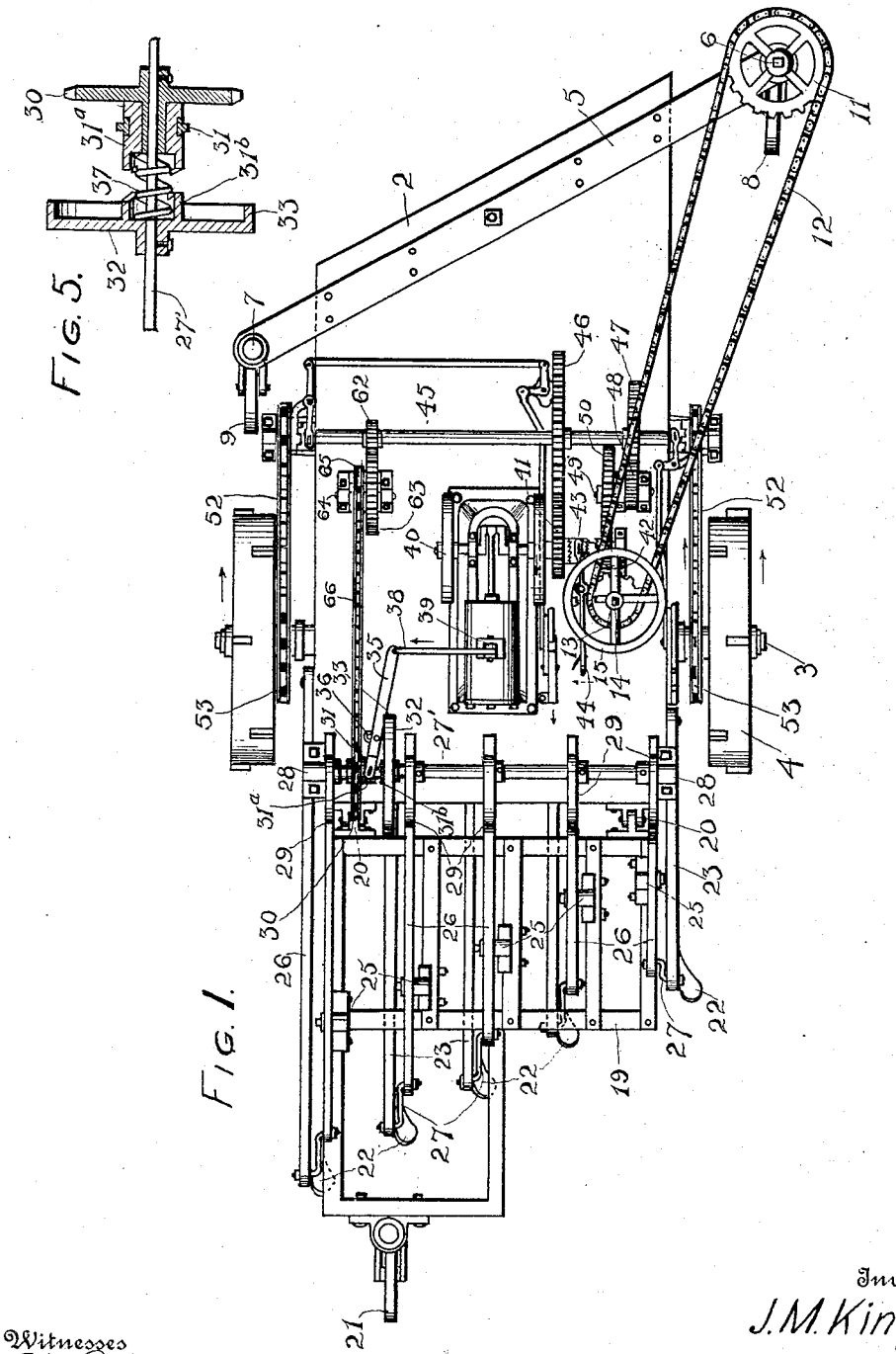

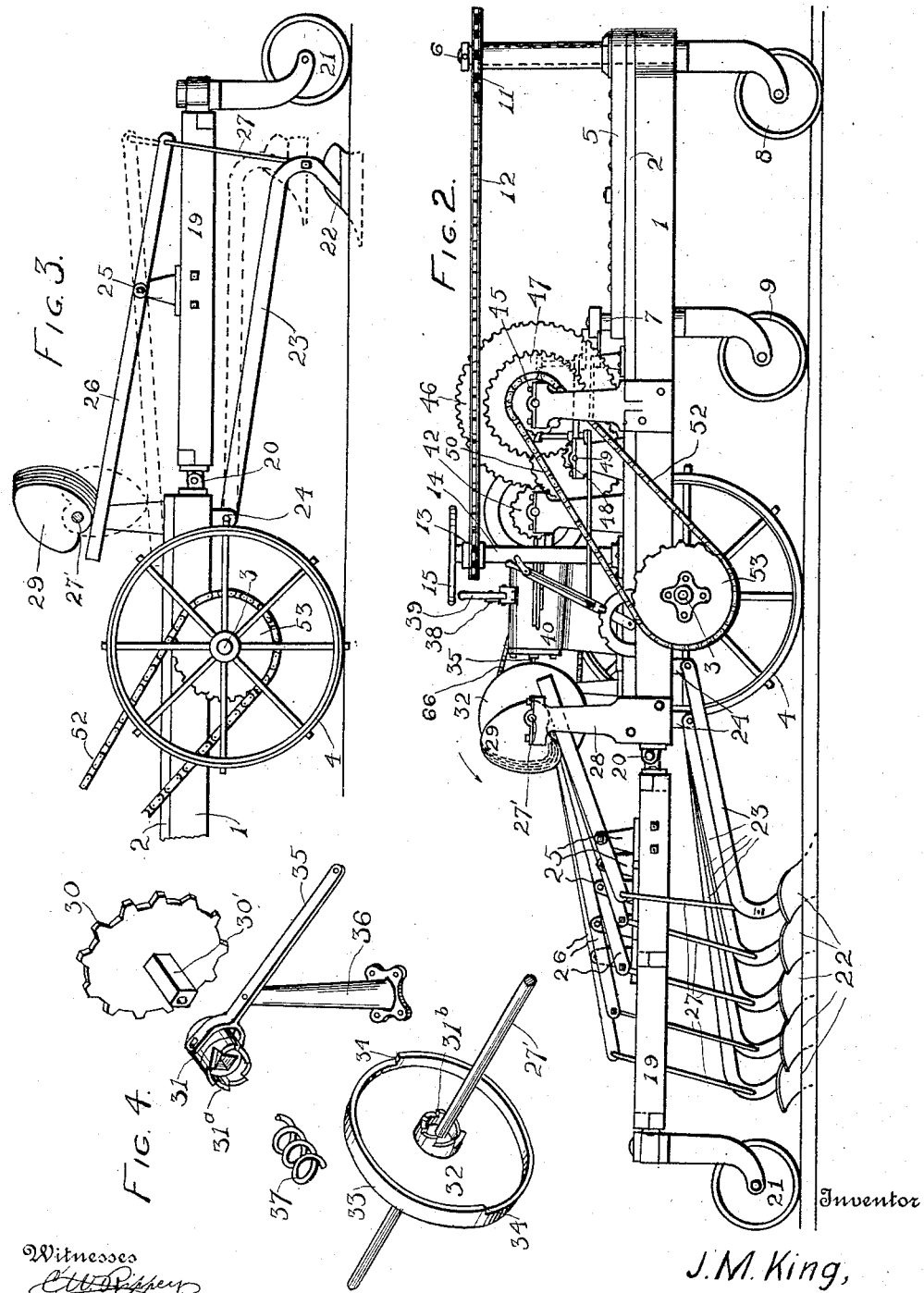

JAMES MOSES KING, OF FRAZEE, MINNESOTA.

GANG-PLOW.

1,177,871. Specification of Letters Patent. Patented Apr. 4, 1916.

Original application filed March 30, 1911, Serial No. 617,942. Divided and this application filed July 18, 1912. Serial No. 710,319.

*To all whom it may concern:*

Be it known that I, JAMES MOSES KING, a citizen of the United States, residing at Frazee, in the county of Becker and State of Minnesota, have invented certain new and useful Improvements in Gang-Plows; and I do declare the following to be a full, clear, and exact description of the invention, such as will enable others skilled in the art to which it appertains to make and use the same.

This invention relates to improvements in the mechanism for raising and lowering the individual plows in a gang plow machine, and its object is to improve the construction of the plow lifting mechanism and its connection with the power shaft by which the gang plow is driven. This object is accomplished by constructing the machine in the manner hereinafter more fully described and claimed, and as shown in the drawings, wherein—

Figure 1 is a plan view, Fig. 2 a side elevation, Fig. 3 a side elevation of the reverse side of the rear portion of the machine, Fig. 4 a detail perspective view of the driving and clutch mechanism for the plow lifting devices, showing the parts slightly separated, and Fig. 5 a detailed sectional view through said parts assembled.

This application is a division from my former application bearing Serial Number 617,942 and filed on March 30th, 1911, in which former case there was described and shown a steering device which may or may not be used in the present instance but which is not illustrated and described in detail as it is not essential to this case. The following description, in so far as it is a repetition of what is embodied in the former application and does not relate to parts covered by the appended claim, is therefore made terse for the sake of brevity.

In the drawings the main frame 1 carries a platform 2 and is supported on an axle 3 by wheels 4. Across the front of the platform is a diagonal bar 5 in whose extremities are mounted the standards 6 and 7 of the front supporting or caster wheels 8 and 9. One of these standards carries a sprocket gear 11 connected by a chain 12 with a gear 13 fixed on the steering post 14 which carries the hand wheel 15, and when the latter is turned the machine can be steered. The caster wheel 9 is intended to travel on the land side, but the caster wheel 8 travels in one of the furrows last made, and—unless it is steered by hand—it will automatically steer the gang plow.

The numeral 19 designates a plow supporting frame the forward end of which is hingedly connected to the rear end of the frame 1 by a suitable hinge 20. The rear end of the frame 19 is supported by a caster wheel 21 the standard of which is pivotally connected with the frame 19 as shown. Beneath the frame 19 are a series of plows 22 the beams 23 of which are pivotally connected at their forward ends to suitable hangers or brackets 24 depending from the main frame as shown. These beams vary in length, being longer at one side of the machine and shorter at the other, and by preference the hanger or bracket 24 of the right-hand plow beam is disposed a trifle forward of the other hangers as seen in Fig. 2. Disposed substantially on an oblique line across the frame 19 and rising therefrom are brackets 25 in which are pivoted a series of levers 26 whose rear arms are of substantially equal length so that the rear ends of the levers are disposed obliquely across the frame, but the front arms of the levers are of varying length, and their front extremities 26' rise to a common line. The rear ends of the rear arms of the levers carry hanger bars or rods 27 which extend downward and are connected with the plow beams as shown, and the length of these hanger bars is by preference such that—as seen in Fig. 3— when the levers are turned on their pivots so that they stand horizontal the plows 22 are raised out of the ground, but when the rear ends of the levers are depressed (see Fig. 2) so that their front ends rise to the common line 26' the plows are dropped into the ground.

For raising or lowering the plows, I provide a suitable lifting mechanism comprising a shaft 27' which is mounted in suitable bearings or standards 28 which rise from the opposite sides of the frame 1, at its rear end, this shaft being thereby disposed straight across the rear end of said frame on a higher level than the lever fulcrums. It will be noted, that the shaft 27' is mounted a slight distance in rear of the forward ends 26' of the levers 26, and that since said levers are of different lengths, they project beneath said shaft at slightly different inclinations, these inclinations gradually growing steeper from the left side of the machine to the right hand side thereof, as clearly seen in Fig. 2. Rigidly mounted upon the shaft 27' and disposed, one above each lever 26, is a plurality of heart-shaped cams 29 which are approximately symmetrical in design, although the right hand cam must necessarily be larger than the left hand cam, in view of the fact that the active portion thereof must depend farther to allow it to touch the right hand lever, since, as above stated, the inclination of this lever is greater than the left hand lever, and, therefore, its intermediate portion is lower. As clearly seen in Fig. 3, the cams 29 gradually grow slightly smaller from the right hand cam, the largest of the series, to the left cam which is the smallest thereof. The result of this formation, is that the active faces of the cams may contact with the power arms of the levers 26 simultaneously whereby, when the shaft 27' is rotated, thereby rotating the cams, all of the levers are simultaneously rocked, but due to the gradually increasing ratio of the power arms of the levers, (the front arms thereof), to the resistance or rear arms, the right hand plows will be raised before the left hand plows, this being due to the fact that, although all of the levers are operated simultaneously, those on the right hand side of the machine will raise their plows before those on the left hand side, on account of the fact that the power and resistance arms of the right hand levers are nearer the same length, than the power and resistance arms of the left hand levers, thereby causing the resistance arms of the latter to travel upwardly at a slower rate of speed than those of the former.

It may here be explained that the precise locations of the members 24 to which the plow beams are pivoted, the exact height of the standards 25, and the length of the links 27 are immaterial features, the important parts of the invention being the levers having differently proportioned power and resistance arms and substantially uniform cams, or other appropriate means for depressing the power arms at substantially the same time, whereby to produce the result above clearly set forth.

The shaft 27' is turned by a suitable operating mechanism comprising a sprocket gear 30 which is loosely mounted on the shaft and is operatively engaged therewith by a clutch device one member 31ª of which is slidably engaged with the squared hub 30' of the gear 30 while the other member 31ᵇ is formed on or connected to a locking disk 32 fixedly mounted on the shaft 27' and having on its outer edge an annular flange 33 in which at diametrically opposite points are formed stop notches 34. With the clutch member 31ª is operatively connected one end of a shifting clutch lever 35 which is pivoted on a suitable standard 36 secured to the platform of the machine and extends across the flange 33. Between the clutch members is arranged a coiled spring 37 whereby said members of the clutch are normally held apart. The outer end of the lever is connected by an operating rod 38 to a suitably mounted hand lever 39 whereby the clutch member 31ª may be thrown into engagement with the clutch member 31ᵇ against the pressure of said spring 37. The cams 29 on the shaft 27' are so arranged with respect to the notches 34 in the flange 33 of the disk 32, that when the plows are in a lowered or operative position and the cams are raised as seen in Fig. 3 one notch 34 or the other is opposite the lever 35 and the latter may stand as seen in Fig. 1 with the members of the clutch disengaged. As soon as said lever is moved to reëngage said clutch members for raising the plow, the shaft 27' commences to rotate and the disk 32 will move with it so that the notch 34 which formerly permitted the lever 35 to stand as seen in Fig. 1 now moves past said lever and the edge of the flange 33 holds the lever in position to keep the clutch members engaged—no matter if the operator should remove his hand from the lever 39— until the shaft 27 has made another half revolution and the plows are again raised out of the ground.

On the platform 2 of the machine is arranged a motor 40 which may be of any suitable style or construction and is here shown in the form of a gas engine. On the drive shaft of the engine are loosely mounted power transmitting gears 41 and 42 said gears being provided with clutch members adapted to be engaged by a double faced clutch 43 which is slidably keyed to the engine shaft and provided with a suitable shifting lever 44 whereby the same may be shifted to engage either one or the other of the gears 41 or 42 thus locking the same to the engine shaft. Revolubly mounted in suitable bearings on the platform of the machine is a power transmitting shaft 45 on which is fixedly mounted a spur gear 46. The gear 46 is in operative engagement with the gear 41 on the engine shaft whereby when said gear 41 is locked to the engine shaft the shaft 45 will be driven in one direction. Also mounted on the shaft 45 is a spur gear 47 which is engaged with a pinion 48 on a short counter-shaft 49 on which is also fixedly mounted a gear 50. The gear 50 is in operative engagement with the gear 42 on the engine shaft whereby when the clutch 43 is shifted into engagement with said gear the shaft 45 will be driven in a reverse direction. The extremities of said power shaft 45 are connected through suitable clutch mechanisms and sprocket chains 52 with sprocket wheels 53 on the hubs of the main wheels 4. By actuating these clutches to drive one main wheel forward while the other is idle, the entire machine can be turned around in a small space, and when performing this operation the steering wheel 15 will be turned to quite an extent so that the caster wheel 8 will stand practically parallel with the main axle. On the shaft 45 is fixedly mounted a spur gear 62 which is in operative engagement with a similar gear 63 fixed on a counter-shaft 64 revolubly mounted in suitable bearings on the platform of the machine. On the shaft 64 is also fixedly mounted a sprocket gear 65 which is connected by a sprocket chain 66 to the sprocket gear 30 on the cam operating shaft whereby, when said sprocket 30 is locked to said shaft, the latter will be driven by the power transmitting shaft 45 to raise and lower the plows as hereinbefore described.

Thus it will be seen that the engine, through the various clutches, may be utilized to drive the machine forward while it is steered either automatically or by hand, to drive one main wheel forward while the machine is steered so that it will turn in a rather small compass, or to drive both main wheels rearward, or both main wheels may be disconnected from the power shaft and the plows raised out of the ground while the machine is standing still. Ordinarily, however, the plows will be raised while the machine is progressing forward, and as it would be impossible to raise the plows while the machine is progressing backward because their shares would then stick in the earth, it will be the business of the operator to note by the positions of the several hand levers which mechanisms are connected with the power shaft before he starts his engine or before he throws the hand lever 39 to set the plow elevating mechanism in action. Once started, it is wise to permit this hand lever to fall back so that the rock lever 35 shall rest on the edge of the flange 33, and when the next notch 34 comes opposite said rock lever the spring 37 will disengage the clutch and the plow elevating mechanism will come to rest with all the plows raised.

I do not wish to be confined to the precise details of construction with respect to the driving mechanism and the clutches by means of which one or both the main wheels are thrown into action in either direction, nor to the details of construction of the steering mechanism; but I consider it wise in a machine of this character to make provision for raising the plows out of the ground whatever the other conditions may be.

What is claimed as new is:—

1. The combination with a frame, of a front plow and a rear plow beneath and pivotally connected to said frame in approximately parallel relation, a lever fulcrumed between its ends above the front plow, a second lever fulcrumed between its ends above the rear plow, the ratio of the power arm of the last mentioned lever to the resistance arm thereof being greater than that of the corresponding arms of the first mentioned lever, independent elements connecting the resistance arms of said levers to the plows, and means whereby the power arms of said levers may be depressed at substantially the same time.

2. The combination with a frame, of a front plow and a rear plow beneath and pivotally connected to said frame in approximately parallel relation, a lever fulcrumed between its ends above the front plow, a second lever fulcrumed between its ends above the rear plow, the ratio of the power arm of the last mentioned lever to the resistance arm thereof being greater than that of the corresponding arms of the first mentioned lever, independent elements connecting the resistance arms of said levers to the plows, and a pair of lever actuating cams in conjunction with said power arms of the levers to be rotated to depress said arms.

3. In a gang plow, the combination with a frame mounted on wheels, a plow frame loosely connected therewith, a series of standards rising from the plow frame on a line extending obliquely across the same, a series of levers pivoted to said standards, a cam shaft journaled on the main frame, a series of lever actuating cams carried rigidly by said shaft and located above the power arms of said levers, means whereby said shaft may be rotated, means for locking the same against rotation, a series of plow beams pivotally connected with the main frame and underlying the plow frame, and independent connections between the resistance arms of said levers and the rear ends of the plow beams, the ratio of the power arms of the levers to the resistance arms thereof, varying from one side of the machine to the other.

In testimony whereof I have hereunto set my hand in presence of two subscribing witnesses.

JAMES MOSES KING.

Witnesses:
J. J. DALY,
H. E. GRAFSLAND.